3,098,080
ALPHA-HYDROXY ANTHRAQUINONES
Rütger Neeff, Leverkusen-Bayerwerk, Germany, assignor to Farbenfabriken Bayer Aktiengesellschaft, Leverkusen, Germany, a corporation of Germany
No Drawing. Filed Mar. 20, 1959, Ser. No. 800,669
Claims priority, application Germany Apr. 26, 1958
1 Claim. (Cl. 260—376)

This invention relates to dyestuffs suitable for the dyeing of materials consisting essentially of polyesters and/or polyamides.

It has been found that optionally further substituted hydroxyanthraquinones which contain arylamino groups, the aryl residues of which are substituted by carb-$\beta$-hydroxyethoxy group, can be used for the dyeing of fiber materials consisting essentially of polyesters and/or polyamides.

The production of the anthraquinone dyestuffs used according to the invention can be carried out by known methods, e.g. by reacting hydroxyanthraquinones in mixture with their leuco compounds, or nitroanthraquinones with the corresponding amines. The anthraquinone dyestuffs may also contain more than one arylamino group substituted in the described manner. The anthraquinone dyestuffs used according to the invention can contain in addition to the hydroxyl group further substituents, such as, e.g. nitro groups or halogen atoms.

The dyeing of fiber materials consisting essentially of polyesters and/or polyamides with the anthraquinone dyestuffs used according to the invention can be carried out in conventional manner. The dyeings thereby obtained possess very good fastness particularly a very good fastness to washing, light and heat.

The following examples are given for the purpose of illustrating the invention, the parts by weight and the parts by volume being in the ratio of kilograms to liters.

*Example 1*

(a) To a mixture of 8 parts by weight of 1,4-dihydroxyanthraquinone, 2.5 parts by weight of leuco-1,4-dihydroxyanthraquinone and 6 parts by weight of boric acid in 50 parts by volume of boiling ethanol a solution is added dropwise within about 8 hours of 8 parts by weight of m-aminobenzoic acid glycol ester in 15 parts by volume of ethanol. Boiling is continued under reflux until completion of the dyestuff formation and the leuco compound is oxidized in conventional manner, e.g. by addition of perborate, alkaline hydrogen peroxide, and the like. After filtering with suction and washing with alcohol, unreacted 1,4-dihydroxy-anthraquinone is removed by stirring the dyestuff with 200 parts by volume of 0.5 n-caustic soda at 50° C. for some time, followed by filtering the hot dyestuff and washing it with hot water. The dry dyestuff is transformed in known manner in a finely dispersible form, e.g. by pasting it with 80% sulfuric acid, grinding the neutrally washed paste with sulphite cellulose waste liquor and an alkyl naphthalene sulfonic acid, and subsequent drying.

The dyestuff consists essentially of an 1-hydroxy-4-anilidoanthraquinone which is substituted in the phenyl residue by a carb-$\beta$-hydroxyethoxy group.

A dyebath is prepared containing a dispersion of 1 part by weight of the above dyestuff and 20 parts by weight of cresotic acid methyl ester in 4000 parts of water, and buffered with sulfuric acid to a pH value of 4.5. 100 parts by weight of polyglycol terephthalate fibers are placed at 50° C. in the dyebath, the latter is heated to 100° C. within 20–30 minutes and the fibers left at this temperature for one and a half hours. After rinsing and drying the fiber a bright violet dyeing is obtained which is distinguished by a very good fastness to washing, gas fumes, ironing, rubbing carbonizing and light as well as an excellent resistance to heat.

If the dyeing process is carried out in the absence of cresotic acid methyl ester at 125° C. for one and a half hours, a bright violet dyeing is likewise obtained having similar fastness properties.

(b) If in the above-described production of the dyestuff instead of 8 parts by weight 16 parts by weight of m-amino-benzoic acid glycol ester are used a dyestuff is obtained which produces a strong bluish violet dyeing.

The dyestuff mixture obtained contains besides the dyestuff described under 1(a) also 1,4-dianilidoanthraquinone which is substituted in each phenyl residue by one carb-$\beta$-hydroxyethoxy group.

*Example 2*

(a) 10 parts by weight of 1,5-dihydroxy-4,8-dinitroanthraquinone are boiled under reflux with 20 parts by weight of m-aminobenzoic acid-glycol ester in 100 parts by weight of glycol monoethyl ether until the whole starting material has disappeared and a sample dissolves in pyridine with a pure blue color. The melt is stirred, after cooling, in 500 parts by volume of 2 n-hydrochloric acid, the solid portions are filtered off by suction and washed neutral. The dyestuff thus obtained dyes without further purification, after usual dispersion, according to the method indicated in Example 1, a strong bright reddish blue which shows excellent fastness to washing and light as well as heat resistance.

The dyestuff consists essentially of 1,5-dihydroxy-8-nitroanthraquinone which is substituted in the 4-position by an anilido group which itself is substituted in the phenyl residue by a carb-$\beta$-hydroxyethoxy group.

Instead of 1,5-dihydroxy-4,8-dinitroanthraquinone an equivalent amount of 1,5-dihydroxy-4,8-dibromanthraquinone may also be used.

(b) If instead of the above-mentioned 1,5-dihydroxy-4,8-dinitroanthraquinone 10 parts by weight of 1,8-dihydroxy-4,5-dinitroanthraquinone are used, a greenish blue coloring product is obtained which also possesses very good fastness properties.

The dyestuff consists essentially of a 1,8-dihydroxy-5-nitroanthraquinone which is substituted in the 4-position by an anilido group which itself is substituted in the phenyl residue by a carb-$\beta$-hydroxyethoxy group.

*Example 3*

10 parts by weight of 1,8-dihydroxy-4,5-dinitroanthraquinone and 20 parts by weight of m-aminobenzoic acid glycol ester are heated in 50 parts by volume of dimethyl formamide to 125–130° C. for 6 hours. The mixture is then stirred in 1000 parts by volume of 5% hydrochloric acid, the precipitated product is filtered off with suction and washed neutral with water. The dyestuff is transformed into a finely dispersible powder by pasting with 80% sulfuric acid, grinding the neutrally washed paste with sulfite cellulose waste liquor and an alkyl naphthalene sulfonic acid and drying. When dyed according to the process described in Example 1 the product yields on polyglycol terephthalate fibers a strong reddish grey having excellent fastness properties. If instead of m-aminobenzoic acid glycol ester there is used the p-isomer, a dyestuff is obtained having similar dyeing properties.

*Example 4*

8 parts by weight of 1,4-dihydroxy-anthraquinone, 2.5 parts by weight of leuco-1,4-dihydroxy-anthraquinone, 12 parts by weight of boric acid, 17 parts by weight of 5-amino-isophthalic acid diglycol ester and 75 parts by volume of ethanol are boiled under reflux for 15 hours. After oxidation of the leuco compound and isolation of the product, the dyestuff is brought into a finely dispersed form. When dyeing polyglycol-terephthalate fibers according to the process indicated in Example 1 a bright red violet is obtained with excellent fastness properties.

*Example 5*

A dyebath is prepared which consists of a dispersion of 1 part by weight of the dyestuff described in Example 1 and 10 parts by weight of a mixture of paraffin-sulfonic acid sodium salt, oleyl polyglycol ether and fatty acid hydroxybenzylamide polyglycol ether in 4000 parts of water, and 100 parts by weight of a polyamide fiber are placed in the dyebath at 25° C. The temperature of the bath is raised to 100° C. within 45 minutes, kept at this temperature for 1 hour, and after rinsing and drying a bright blue violet dyeing is obtained with very good fastness properties.

I claim:

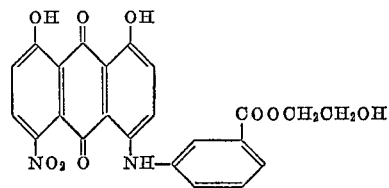

References Cited in the file of this patent
UNITED STATES PATENTS

| | | |
|---|---|---|
| 1,078,505 | Herzberg et al. | Nov. 11, 1913 |
| 1,833,272 | Wilke | Nov. 24, 1931 |
| 2,015,011 | Haddock et al. | Sept. 17, 1935 |
| 2,766,262 | Belshaw | Oct. 9, 1956 |
| 2,918,344 | Jenny | Dec. 22, 1959 |
| 2,944,870 | Atkinson et al. | July 12, 1960 |